No. 724,693. PATENTED APR. 7, 1903.
R. S. GRAHAM.
WHEEL TIRE.
APPLICATION FILED SEPT. 30, 1902.
NO MODEL.
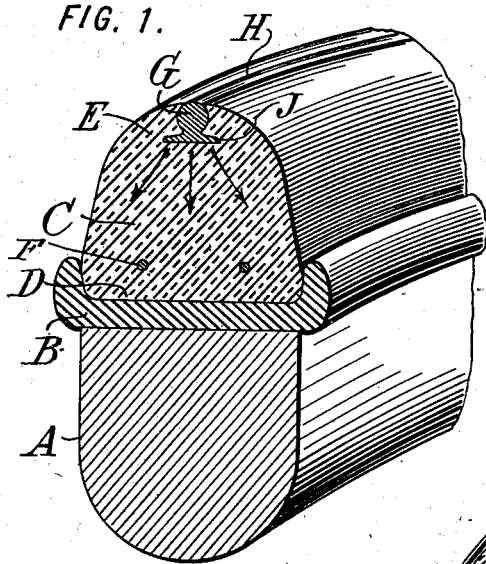
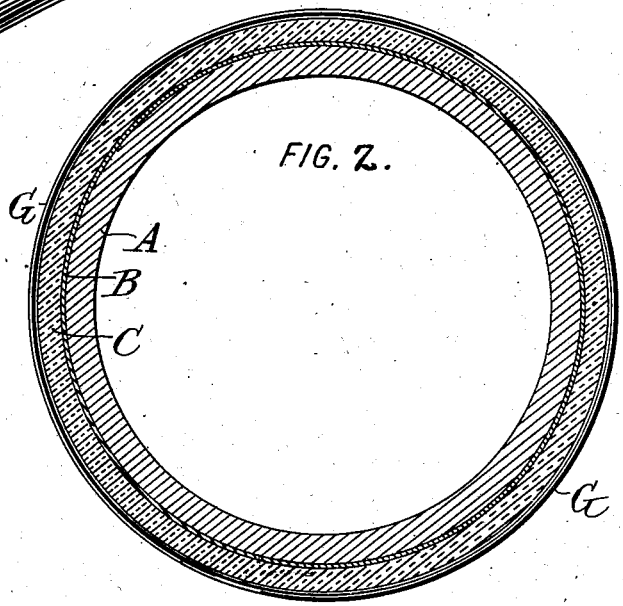
WITNESSES:
INVENTOR:
Robert S. Graham,
By Attorneys,

UNITED STATES PATENT OFFICE.

ROBERT S. GRAHAM, OF NEW YORK, N. Y., ASSIGNOR OF ONE-FOURTH TO WILLIAM M. PERKINS, OF NEW YORK, N. Y.

WHEEL-TIRE.

SPECIFICATION forming part of Letters Patent No. 724,693, dated April 7, 1903.

Application filed September 30, 1902. Serial No. 125,349. (No model.)

*To all whom it may concern:*

Be it known that I, ROBERT S. GRAHAM, a citizen of the United States, residing in the borough of Manhattan, city, county, and State of New York, have invented certain new and useful Improvements in Wheel-Tires, of which the following is a specification.

My invention aims to provide certain improvements in tires for wheels—such, for example, as carriage or automobile wheels—whereby the life of the tire is prolonged, while maintaining the resiliency due to the now common use of rubber for such purposes.

My invention has certain other advantages, referred to in detail hereinafter.

Referring to the drawings illustrating embodiments of my invention, Figure 1 is a perspective view of a portion of a tire attached to the rim of a wheel. Fig. 2 is a section taken longitudinally through the tire and wheel-rim of Fig. 1.

Various compositions of rubber and fiber which are now generally used for tires for pleasure-vehicles are necessarily made soft in order to preserve their resiliency, and the result of their softness is a very rapid wear of the tread-surface. If the tire is made of hard material, such as metal, there results an unpleasant noise and jarring, and also with a given amount of power the vehicle is slower. I propose to make the body of the tire of a resilient material, such as rubber, and to provide a metal tread which shall take all or the greater part of the abrasion to which the tire is ordinarily subjected. I thus utilize the resilient quality of the rubber and the durable quality of the metal. There is no substantial loss of elasticity, because the pressure is transmitted from the metal tread through the resilient body to the rim of the wheel, and because also the continuous hoop of steel which preferably forms the tread of my tire is itself highly elastic. In the preferred form of the invention the wearing-surface of the metal tread is substantially flush with the adjacent portions of the resilient body, the main portion of the tread being embedded in the resilient body, so as to dampen the vibrations, which might otherwise make a jarring noise.

Referring now to the embodiments shown in the drawings, A is a wheel-rim of wood provided with a trough-shaped metal band B, in which the tire is carried. The preferred form of tire comprises a solid rubber body C with a broad base D, filling or nearly filling the trough-shaped band B, and a narrower outer portion E. The tire may be held on the rim by means of retaining rods or wires F, embedded therein near its base in the usual manner, or I may dispense with these wires, using the metal tread of the tire for this purpose in addition to the purposes for which it is principally designed. The tread of the tire is indicated at G as embedded in the outer portion thereof and substantially flush with the outer face, so as to expose only a narrow face H, which, however, is of sufficient width to take substantially all the pressure to which the tire is subjected. The pressure is transmitted from the tread G through the large interposed body of elastic material, as indicated by the arrows, and distributed properly over the rim of the wheel. Very little direct pressure is exerted upon the outer portion E of the body of the tire at the sides of the tread G; but these parts serve to embrace and hold the tread firmly in position and also to deaden any lateral vibration which may occur. In order to preserve a close union between the tread and the body of the tire, they may be vulcanized together or cemented or they may be without any such close artificial union. For the reasons described the wear which may occur upon the portion E of the body of the tire is not material, nor can such wear be very great, because the metal tread will prevent the rubber from pressing very close against the pavement. Great elasticity of the metal tread itself is secured by making it of steel and in a hoop extending continuously longitudinally around the body of the tire, as shown in Fig. 2. In order that the resilient body shall secure a good hold upon the metal tread, the latter is flared or flanged at its inner portion, as shown in Fig. 1, where the metal tread is in cross-section somewhat analogous to a railroad-rail, with a broad tread H and with flanges J to give it lateral stiffness and at the same time to secure a broad base for transmitting pressure to the resilient body, and also to insure a permanent engagement with the outer portion E of the resilient body. With such a shape as this the pressure of the tread causes the outer portion E of the resilient body to hug the tread closer, thus keeping the tire in good shape.

For very heavy vehicles it is cutomary to use broad tires, and for this purpose I may increase the width of the tread or I may employ a plurality of narrow treads.

My invention may be applied to other types of resilient tire—such, for example, as pneumatic tires.

The shape of the metal tread may be almost infinitely varied, and I do not attempt to show all the possible forms which can be made use of. I may also arrange the tread in such a way as to lessen the wear on the adjacent portions E of the resilient body by projecting it more or less beyond the face of the resilient body.

By the entire elimination of retaining-rods, such as F, near the base of the resilient material and the substitution therefor of a rod embedded in the outer tread portion, either at the central point or at the side of the tread portion E, several decided advantages are secured. With the rods at the base of the resilient body of the tire, as in present practice, the constant and severe wrenching produces a constant relative movement of the resilient material up and down about the retaining-rods, so that the rubber wears rapidly at this point and is no longer tightly held by the retaining-rod, but wabbles most unpleasantly. In fact, it often happens that the retaining-rod cuts entirely through to the base of the resilient material. With the retaining-rod at or near the tread of the rubber there is very little movement of the rubber relatively to the retaining-rod. Furthermore, a retaining-rod at the tread portion of the rubber does not need to be threaded through the same, as is the case with the retaining-rods F, but can be put in place either before or after the rubber is put in place. Being easily accessible, the retaining-rod at the outside of the rubber can be drawn more tightly around the tire, and this advantage is increased by the ability to use the elasticity of the entire elastic body instead of only the base portion thereof in tightening the outside retaining-rod. The rubber being more highly compressed will also wear less rapidly than with retaining-rods merely at the base of the rubber.

Though I have described with great particularity of detail certain embodiments of my invention, yet it is not to be understood that the invention itself is limited to the specific embodiment disclosed. Various modifications in the details and arrangement and combination of the parts may be made without departing from the spirit of the invention.

What I claim is—

1. A wheel-tire comprising in combination a resilient body and a metal tread embedded in said body substantially flush with the outer face thereof, the inner portion of said metal tread being flanged to form a secure engagement with said body.

2. A wheel-tire comprising in combination, a resilient body and a metal tread embedded in said body and having an inner flanged portion to provide a broad base for transmitting pressure to the resilient body and to cause the outer portion of the body to hug the tread closely.

In witness whereof I have hereunto signed my name in the presence of two subscribing witnesses.

ROBERT S. GRAHAM.

Witnesses:
 DOMINGO A. USINA,
 FRED WHITE.